Aug. 21, 1945.       J. R. HUGHES            2,383,388
                     WEEDING TOOL
                   Filed Feb. 10, 1944
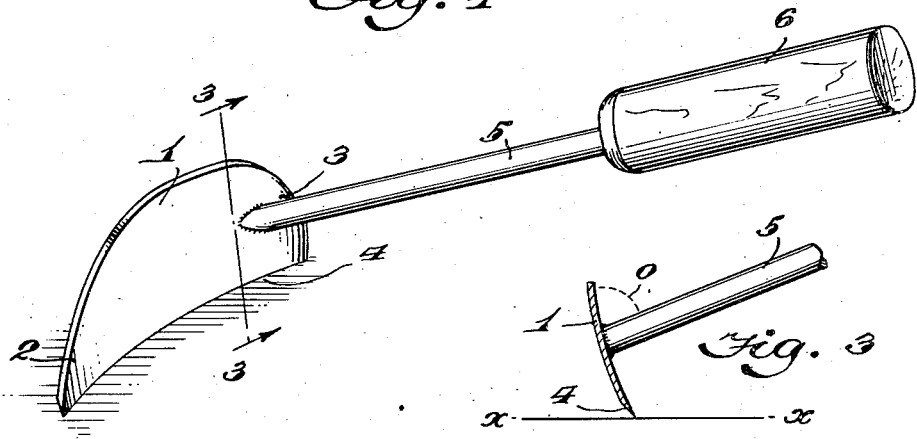
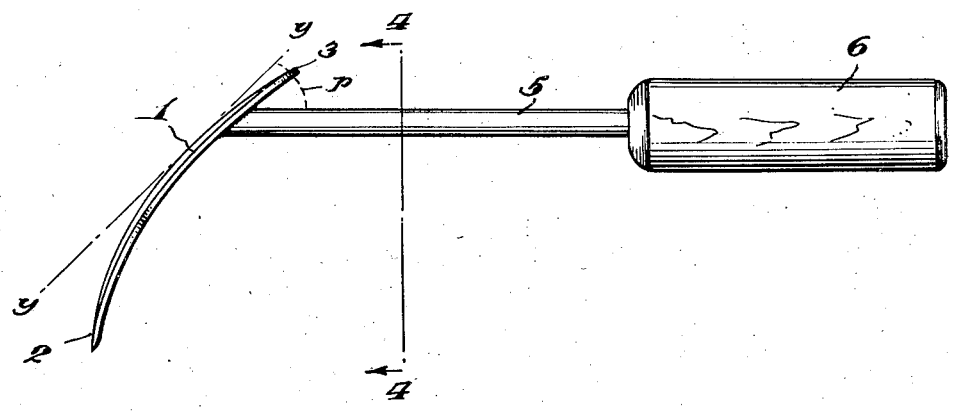
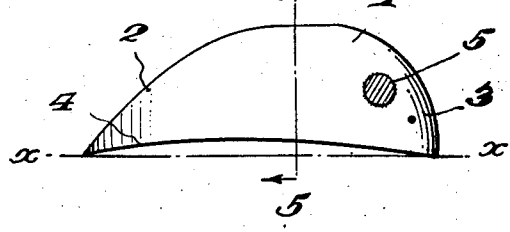  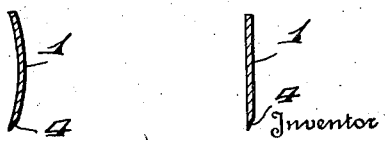 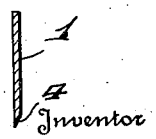
Inventor
John R. Hughes,
By Stone, Boyden & Mack,
            Attorneys.

Patented Aug. 21, 1945

2,383,388

UNITED STATES PATENT OFFICE 2,383,388

WEEDING TOOL

John R. Hughes, Urbanna, Va.

Application February 10, 1944, Serial No. 521,855

4 Claims. (Cl. 97—63)

This invention relates to weeding tools, and more particularly to a hand tool especially designed for weeding and thinning small vegetable plants, such as spinach and the like.

When such plants are quite young they require close hand weeding and thinning, in order that they may properly develop.

The object of the present invention is to provide a weeding tool having a relatively short handle and adapted to be operated by one hand, with the operator in a stooping position, which tool is so shaped as to readily enter the space between the rows, and between individual plants in a row.

In order that the invention may be readily understood, reference is had to the accompanying drawing, forming part of this specification, and in which—

Fig. 1 is a perspective view of my improved tool, showing the same in position for use.

Fig. 2 is a plan or edge view of the tool.

Fig. 3 is a section substantially on the line 3—3 of Fig. 1, looking in the direction of the arrows.

Fig. 4 is a section on the line 4—4 of Fig. 2, looking in the direction of the arrows.

Fig. 5 is a section on the line 5—5 of Fig. 4, looking in the direction of the arrows, and Fig. 5A is a similar section showing a slightly modified construction.

Referring to the drawing in detail, my improved tool comprises a thin blade I made of steel or other wear-resisting material. This blade is of elongated form, having at one end a tapered or beveled point 2 and at the other end a rounded heel 3. The longest side edge, that is to say, the side edge which is normally the lower edge, is sharpened, as indicated at 4.

Rigidly secured to the blade, at a point adjacent the heel thereof, is a relatively small but stiff shank 5, shown as a round rod, and having a suitable handle 6 at its free end. This shank 5, although somewhat longer than the blade, is still relatively short as compared with the ordinary hoe handle; the tool, as above stated, being designed to be manipulated entirely by one hand.

By reference to Fig. 2, it will be seen that the blade I is curved or arcuate longitudinally, and, as shown in Figs. 3 and 5, may also be slightly curved transversely. The handle shank 5 extends from the concave side of the blade, preferably at a point adjacent but spaced from the heel thereof, and also intermediate the side edges of the blade. This location of the relatively small shank at a point wholly above the lower side or cutting edge of the blade, leaves the entire cutting edge free and unobstructed, throughout its length. The attachment of the rigid shank at a point between the ends of the blade gives stability to the tool and renders it well balanced. While the shank is shown as secured to the blade by welding, it may of course be attached in any other well known manner.

By reference to Fig. 3, it will be seen that the shank 5, as viewed in a vertical plane, is preferably not at right angles to the blade I, but forms therewith an angle o slightly less than 90°.

By reference to Fig. 2, it will be seen that the shank 5 is set at a sharp or acute angle p to a tangent y—y, to the arc of curvature of the blade at the point of attachment. Thus, the handle shank is disposed at an angle to the blade, both vertically and horizontally.

Fig. 1 illustrates the tool as it appears when in position for use. In this position it will be noted that the handle shank extends at an acute angle to the ground, that is to say to the plane of the sharpened or cutting edge 4 of the blade. It will also be noted that, as shown in Fig. 3, the blade, when in use, is somewhat tilted with respect to the ground, indicated by line x—x. When in this position, the curved sharpened edge 4 lies substantially in the plane of the surface of the ground.

When, however, the shank 5 occupies a substantially horizontal position, as shown in Fig. 4, the lower or cutting edge of the blade no longer lies in the plane x—x, but forms an arch with respect thereto.

The angular relation of the handle shank to the blade is an important feature of the invention, as it is this angular relation which enables the blade to be effectively and easily manipulated to remove undesired growth from between the plants.

While in Figs. 1-5, I have shown the blade as slightly curved transversely, such blade may, if desired, be made flat transversely, as illustrated in Fig. 5A. In any event, the transverse curvature is relatively slight.

While I have illustrated in the drawing what may be termed a right hand tool, it will of course be understood that, by reversing the relative position of the parts, the tool may be made for left hand operation, if desired.

What I claim is:

1. A one hand weeding tool comprising an elongated thin blade, having a beveled point at one end and a heel at the other, and sharpened along one side edge, said blade itself being curved longitudinally between point and heel, and a relatively small handle shank rigidly secured to said blade at a point adjacent but spaced from the heel and extending from the concave side thereof at a sharp angle thereto.

2. A one hand weeding tool comprising an elongated thin blade, having a beveled point at one end and a heel at the other, and sharpened along one side edge, said blade being curved longitudinally between point and heel, and a relatively small handle shank rigidly secured to said blade at a point between the side edges thereof and adjacent the heel, and extending from the concave side thereof, said shank being disposed at an acute angle both to a tangent to the arc of curvature and to the plane of said sharpened edge.

3. A one hand weeding tool comprising an elongated thin blade, having a beveled point at one end and a heel at the other, and sharpened along one side edge, said blade being curved longitudinally between point and heel, and a straight handle shank rigidly secured to said blade at a point adjacent but spaced from the heel, and extending from the concave side thereof, said shank being disposed at an acute angle to the plane of said sharpened edge.

4. A one hand weeding tool comprising an elongated thin blade, having a beveled point at one end and a heel at the other, and sharpened along one side edge, said blade being curved longitudinally between point and heel, and substantially flat transversely, and a relatively small, straight handle shank rigidly secured to said blade at a point intermediate the side edges thereof adjacent the heel, and extending from the concave side thereof, the sharpened edge of the blade lying in a substantially horizontal plane when said handle shank is held at the normal operating angle to such plane.

JOHN R. HUGHES.